US010481245B2

(12) United States Patent
LaPat et al.

(10) Patent No.: US 10,481,245 B2
(45) Date of Patent: Nov. 19, 2019

(54) HIGH RANGE RESOLUTION RADAR PROFILING USING FREQUENCY JUMP BURST-PULSE DOPPLER WAVEFORM AND PROCESSING

(71) Applicant: Raytheon Company, Waltham, MA (US)

(72) Inventors: Ronald LaPat, Westford, MA (US); Pierre Jean-Laurent, Andover, MA (US); Anthony E. LoPresti, North Chelmsford, MA (US); Harry Mieras, Bedford, MA (US); Thong Pham, Cumberland, RI (US)

(73) Assignee: Raytheon Company, Waltham, MA (US)

( * ) Notice: Subject to any disclaimer, the term of this patent is extended or adjusted under 35 U.S.C. 154(b) by 733 days.

(21) Appl. No.: 15/200,418

(22) Filed: Jul. 1, 2016

(65) Prior Publication Data
US 2018/0003802 A1    Jan. 4, 2018

(51) Int. Cl.
*G01S 7/41* (2006.01)
*G01S 13/34* (2006.01)
(Continued)

(52) U.S. Cl.
CPC ............ *G01S 7/414* (2013.01); *G01S 7/2922* (2013.01); *G01S 7/4004* (2013.01); *G01S 13/0209* (2013.01); *G01S 13/18* (2013.01); *G01S 13/34* (2013.01); *G01S 13/5246* (2013.01); *G01S 13/582* (2013.01); *G01S 7/2923* (2013.01);
(Continued)

(58) Field of Classification Search
None
See application file for complete search history.

(56) References Cited

U.S. PATENT DOCUMENTS 4,914,441 A    4/1990 Brookner
8,044,846 B1   10/2011 Urkowitz et al.
(Continued)

OTHER PUBLICATIONS

European 161/162 Communication dated Feb. 14, 2019 for European Application No. 17731764.1; 3 Pages.
(Continued)

*Primary Examiner* — Whitney Moore
(74) *Attorney, Agent, or Firm* — Daly, Crowley, Mofford & Durkee, LLP (57) ABSTRACT

The concepts, systems and methods described herein are directed towards frequency jump burst-pulse-Doppler (FJB-PD) waveforms and processing to provide wideband, high range resolution (HRR) radar profiling capability in a clutter dense environment. The method includes transmitting a FJB-PD waveform comprising a plurality of frequency steps over a predetermined time period with each frequency step having a plurality of pulses. The method further includes receiving one or more FJB-PD pulse returns corresponding to the FJB-PD waveform and identifying one or more target detections in the one or more FJB-PD pulse returns. A set of range swaths may be extracted for each of the one or more target detections and a wideband spectrum may be generated for each of the sets of range swaths using FJB coherent integration. A clutter suppressed HRR profile may be generated for each of the target detections based on the respective wideband spectrum.

23 Claims, 7 Drawing Sheets

(51) Int. Cl.
*G01S 13/524* (2006.01)
*G01S 13/58* (2006.01)
*G01S 7/292* (2006.01)
*G01S 7/40* (2006.01)
*G01S 13/02* (2006.01)
*G01S 13/18* (2006.01)

(52) U.S. Cl.
CPC ............... *G01S 2007/4069* (2013.01); *G01S 2007/4091* (2013.01)

(56) References Cited

U.S. PATENT DOCUMENTS

| | | |
|---|---|---|
| 2004/0150552 A1 | 8/2004 | Barbella et al. |
| 2007/0194976 A1* | 8/2007 | Reed ................ G01S 7/024 342/22 |
| 2017/0324440 A1* | 11/2017 | Snow ................ H04B 7/0837 |

OTHER PUBLICATIONS

PCT International Search Report & Written Opinion dated Oct. 16, 2017 from International App. No. PCT/US2017/037106; 15 Pages.
PCT International Preliminary Report dated Jan. 10, 2019 for International Application No. PCT/US2017/037106; 10 Pages.

\* cited by examiner

HIGH RANGE RESOLUTION RADAR PROFILING USING FREQUENCY JUMP BURST-PULSE DOPPLER WAVEFORM AND PROCESSING

GOVERNMENT INTERESTS

This invention was made with the government support under Contract No. W31P4Q-14-C-0093 awarded by the U.S. Army. The government has certain rights in this invention.

BACKGROUND

As is known in the art, target detection systems having a relatively wide frequency bandwidth can be used to generate target wideband target profiles for improved range resolution. The wide bandwidth may be generated instantaneously, or over time and coherently integrated. The benefits of generating wideband target profiles, however, may be readily reduced or lost by ground and volume clutter. Thus, clutter mitigation is an important aspect of any target detection system.

SUMMARY

The concepts, systems and methods described herein are directed towards frequency jump burst-pulse-Doppler (FJB-PD) waveforms and processing that can be used to provide wideband, high range resolution (HRR) radar profiling capability in a clutter dense environment.

In an embodiment, the FJB-PD waveform and processing methods described herein combine clutter mitigation benefits of pulse-Doppler (PD) and high range resolution (HRR) benefits of FJB. The FJB-PD waveform and processing provides wideband HRR profiling in dense stationary and volumetric clutter environments against low to high range-rate targets.

In an embodiment, a FJB-PD waveform can be generated having a sequence of pulses (e.g., pulse-Doppler pulses) that are stepped in frequency over a dwell period at regular intervals. Each frequency step in the FJB-PD waveform may include two or more pulses. In some embodiments, the FJB-PD waveform can be generated such that each frequency step has a pulse repetition interval (PRI) that is inversely proportional to the respective step's center frequency so as to maintain a constant range-rate target at the same Doppler bin across frequency steps, in order to preserve the clutter-free region. The PRI can be a fixed PRI or a constant-Doppler PRI.

In an embodiment, each sequence of pulses at a particular frequency step may be processed independently of another sequence of pulses at a different frequency step in the FJB-PD waveform. The FJB-PD waveform can be coherently processed to yield extended bandwidth over the dwell period to generate clutter suppressed HRR profiles.

In an embodiment, FJB-PD pulse returns can be initially range-rate compensated as part of a matched filter processing, using a coarse range-rate estimate from a narrowband tracker, for example. The pulses in the FJB-PD pulse returns can be processed into a set of range-Doppler arrays. In some embodiment, one range-Doppler array may correspond to each frequency step. The range-Doppler arrays may facilitate the separation of targets from clutter and also help to resolve targets that may be too close in range or range-rate to resolve in either dimension alone. In some embodiments, the set of range-Doppler arrays may be non-coherently integrated over frequency step prior to a constant false alarm rate (CFAR) processing in order to enhance detection performance. A list of target detections may be established, and for each of these detections, a set of range swaths corresponding to a frequency step can be extracted from the set of range-Doppler arrays. The set of range swaths may be coherently integrated by using FJB processing to generate clutter suppressed HRR profiles.

In one aspect, a method for processing a FJB-PD waveform and generating a HRR profile is described herein. The method includes transmitting a FJB-PD waveform comprising a plurality of frequency steps over a predetermined time period with each frequency step having a plurality of pulses (e.g., pulse-Doppler pulses). One or more FJB-PD pulse returns may be received corresponding to the FJB-PD waveform and one or more target detections can be identified in the one or more FJB-PD pulse returns. A set of range swaths may be extracted for each of the one or more target detections. Next, a wideband spectrum may be generated for each of the sets of range swaths using FJB coherent integration, wherein at least one wideband spectrum is generated for each of the one or more target detections. A clutter suppressed high range resolution (HRR) profile may be generated for each of the target detections based on the respective wideband spectrum.

In an embodiment, the method includes performing range-rate compensation on the one or more FJB-PD pulse returns. A set of range-Doppler arrays may be generated for the one or more FJB-PD pulse returns. For example, in some embodiments, at least one range-Doppler array may be generated for each frequency step. The set of range-Doppler arrays may be integrated over the plurality of frequency steps using non-coherent integration. In some embodiments, constant false alarm rate (CFAR) processing may be performed on the set of range-Doppler arrays. A wideband calibration may be performed on the wideband spectrum.

In some embodiments, the method includes generating the FJB-PD waveform comprising the plurality of frequency steps over the predetermined time period (e.g., dwell period). A sequence of the plurality of pulses may be generated for each of the frequency steps. Each of the sequences may have at least one of a constant-Doppler pulse repetition internal (PRI) or a fixed pulse repetition internal (PRI). The PRI at each of the plurality of frequency steps may be inversely proportional to a step center frequency of the respective frequency step.

In some embodiments, the method includes transmitting a calibration FJB-PD waveform comprising a plurality of frequency steps over a predetermined time period with each frequency step having a plurality of pulses. The calibration FJB-PD waveform may be transmitted internally to a radar system. The calibration FJB-PD pulse returns may be received corresponding to the calibration FJB-PD waveform processed in the same manner as the FJB-PD pulse returns received from an external source. For example, a calibration wideband spectrum may be generated based on the calibration FJB-PD pulse returns.

In some embodiments, the calibration wideband spectrum may be used to calibrate the wideband spectrum of the target returns. A clutter suppressed HRR profile may be generated for each of the calibrated target detections responsive to the comparison.

In another aspect, a method for performing FJB-PD processing is described herein. The method includes transmitting a FJB-PD waveform comprising a plurality of frequency steps over a predetermined time period with each frequency step having a plurality of pulses. One or more FJB-PD pulse returns may be received corresponding to the FJB-PD waveform. In some embodiments, a set of range-Doppler arrays may be generated for the one or more FJB-PD pulse returns. In an embodiment, at least one range-Doppler array can be generated for each frequency step. One or more target detections may be identified in the one or more FJB-PD pulse returns using the set of range-Doppler arrays and a set of range swaths may be extracted corresponding to each of the one or more target detections from the set of range-Doppler arrays.

In some embodiments, the method includes generating the FJB-PD waveform comprising the plurality of frequency steps over the predetermined time period. A sequence of the plurality of pulses may be generated for each of the frequency steps. Each of the sequences may have at least one of a constant-Doppler pulse repetition internal (PRI) or a fixed pulse repetition internal (PRI). In an embodiment, the PRI at each of the plurality of frequency steps may be inversely proportional to a step center frequency of the respective frequency step.

In some embodiments, the method includes performing range-rate compensation on the one or more FJB-PD pulse returns. One or more targets may be isolated from clutter in the one or more FJB-PD pulse returns. The set of range-Doppler arrays may be integrated over the plurality of frequency steps using non-coherent integration. In some embodiments, a constant false alarm rate (CFAR) processing may be performed on the set of range-Doppler arrays. The set of range swaths may be coherently integrated using FJB coherent processing. In an embodiment, the meth may include processing each of the one or more target detections using FJB processing independent of another of the one or more target detections. A clutter suppressed high range resolution (HRR) profile may be generated for each of the target detections.

BRIEF DESCRIPTION OF THE DRAWINGS

The foregoing features may be more fully understood from the following description of the drawings in which.

DETAILED DESCRIPTION

Figure 1:
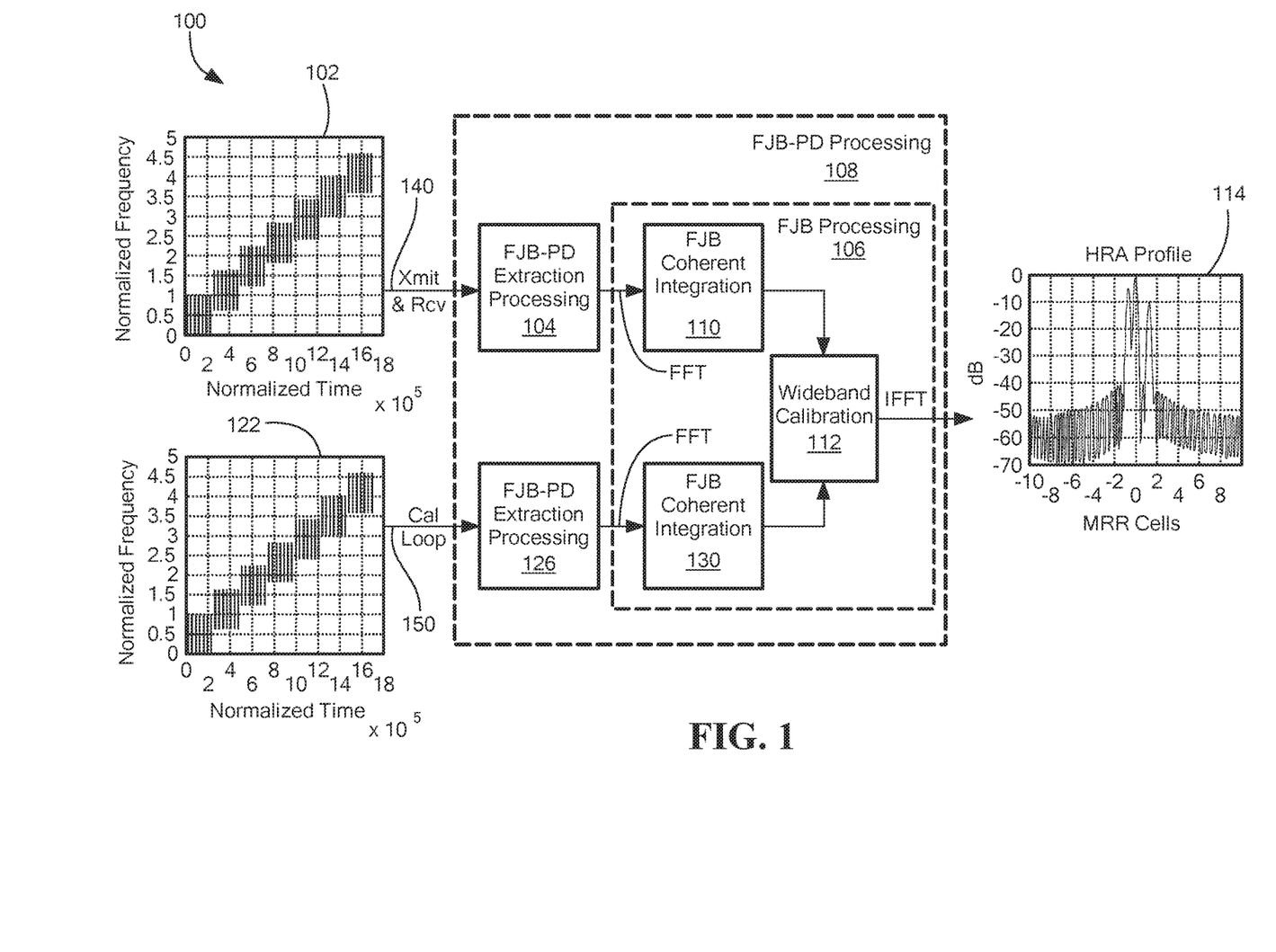
FIG. 1 is a block diagram of a frequency jump burst-pulse-Doppler (FJB-PD) processing method.

Now referring to FIG. 1, a system 100 includes a frequency jump burst-pulse-Doppler (FJB-PD) processing system 108. FJB-PD processing system 108 may be part of a radio frequency (RF) transmit receive system such as a radar system for transmitting and receiving signals (also referred to herein as waveforms) to generate wideband, high range resolution profiles of target detections.

FJB-PD processing system 108 includes an FJB-PD extraction processing module 104 (or more simply "FJB-PD extraction module 104") configured to process signals (also sometimes referred to herein as waveforms) provided thereto and to provide such processed signals to an FJB processing module 106 (or more simply "FJB module 106"). Thus, FJB-PD extraction module 104 and FJB processing module 106 collectively form the FJB-PD processing system 108.

The FJB-PD system 108 may be a first portion of a radar system and the FJB module 106 may be a second portion of the radar system. Thus, a radar system may incorporate both pulse-Doppler waveforms and processing, as well as FJB waveforms and processing and FJB-PD waveforms and processing to generate high range resolution profiles even in clutter dense environments.

In an embodiment, FJB-PD system 108 may have at least one path for processing received signals. Practical systems may optionally include at least one path for calibration although a calibration path is not required per se. In the illustrative embodiment of FIG. 1, for example, a first path may be a transmit/receive path 140 and a second path may be a calibration path 150. In an embodiment, the transmit/receive path 140 may be used for receiving waveforms that are transmitted and received via an antenna (not shown) coupled to FJB-PD system 108. For example, the waveforms may be transmitted at an intended target for detection purposes.

Calibration path 150 may be used to process internally generated calibration waveforms (referred to as a calibration FJB-PD waveform) provided to an FJB-PD extraction processing module 126 of FJB-PD system 108. The calibration FJB-PD waveform may be used to capture or model the transfer function of the radar system. In some embodiments, the transfer function may have corruptive qualities (e.g. qualities which can corrupt processing of received waveforms and the generation of HRR profiles). For example, the calibration path 150 may be an independent radar action that produces a waveform (e.g., calibration FJB-PD waveform) that is intended to be transmitted through the antenna but instead feeds that transmitted waveform back into the radar receiver (and thus not through the antenna). The calibration FJB-PD waveform may be used to correct for any corruptive issues in either or both a transmit chain or a receive chain of the system 100. In some embodiments, the corruptive issues may include any RF leakage, IF leakage, missing frequency steps (e.g., center frequency is not produced) or any other interference from that of an ideal radar waveform. Thus, the calibration FJB-PD waveform can be used to detect such corruptive issues and to filter them out or provide appropriate calibration values to reduce (and ideally eliminate) the effects of such corruptive issues prior to generating a high range resolution (HRR) profile as will be discussed in greater detail below. In some embodiments, the calibration may run concurrently with the processing of an externally transmitted and received waveform. In other instances, the calibration may be performed independently and at a separate time from the processing of an externally transmitted and received waveform. For example, in one embodiment, the calibration may be performed before the externally transmitted and received waveform is processed and the results may be stored.

In some embodiments, the FJB-PD system 108 receives FJB-PD pulse returns 102, 122 through respective ones of the signal paths 140, 150 within the FJB-PD system 108. The processing performed in the different paths (i.e., transmit and receive path 140, calibration path 150) may be substantially the same, however, the method that the intended waveform or pulse return arrives at each path is different (i.e., FJB-PD pulse returns 102, calibration FJB-PD pulse returns 122). Thus, any processing described herein may refer to the processing of the FJB-PD pulse returns 102 in the transmit and receive path 140, or to the processing of the calibration FJB-PD pulse returns 122 in the calibration path 150.

In an embodiment, the FJB-PD module 108 may include FJB-PD extraction modules 104, 126. In an embodiment, at least one FJB-PD extraction module 104, 126 may be provided on each path within the system 100. For example, a first FJB-PD extraction module 104 may be provided on the transmit/receive path 140 and a second extraction module 126 may be provided on the calibration path 150. In an embodiment, an input of the first FJB-PD extraction module 104 may receive the first FJB-PD pulse returns 102 and an input of the second extraction module 126 may receive the second calibration FJB-PD pulse returns 122.

The output of each of the FJB-PD extraction modules 104, 126 may be provided to the FJB module 106 for FJB processing. The FJB module 106 may include FJB coherent integration modules 110, 130 and a wideband calibration module 112.

In an embodiment, a first FJB coherent integration module 110 may be provided on the transmit/receive path 140 and a second FJB coherent integration module 130 may be provided on the calibration path 150. Thus, an input of the first FJB coherent integration module 110 may be coupled to an output of the first FJB-PD extraction module 104 and an input of the second FJB coherent integration module 130 may be coupled to an output of the second FJB-PD extraction module 126.

In an embodiment, the outputs of each of the FJB coherent integration modules 110, 130 may be coupled to an input to a wideband calibration module 112. The wideband calibration module 112 may compare a wideband spectrum generated by each the transmit/receive path 140 and the calibration path 150. The wideband calibration module 112 may detect any quality issues or corruptive properties within the waveform processing system 100 and filter them accordingly to generate a HRR profile 114 for each target detection. In some embodiments, the wideband calibration module 112 may perform an inverse fast Fourier transform (IFFT) on the wideband spectrum to generate the HRR profile 114 for each target detection.

Figure 2:
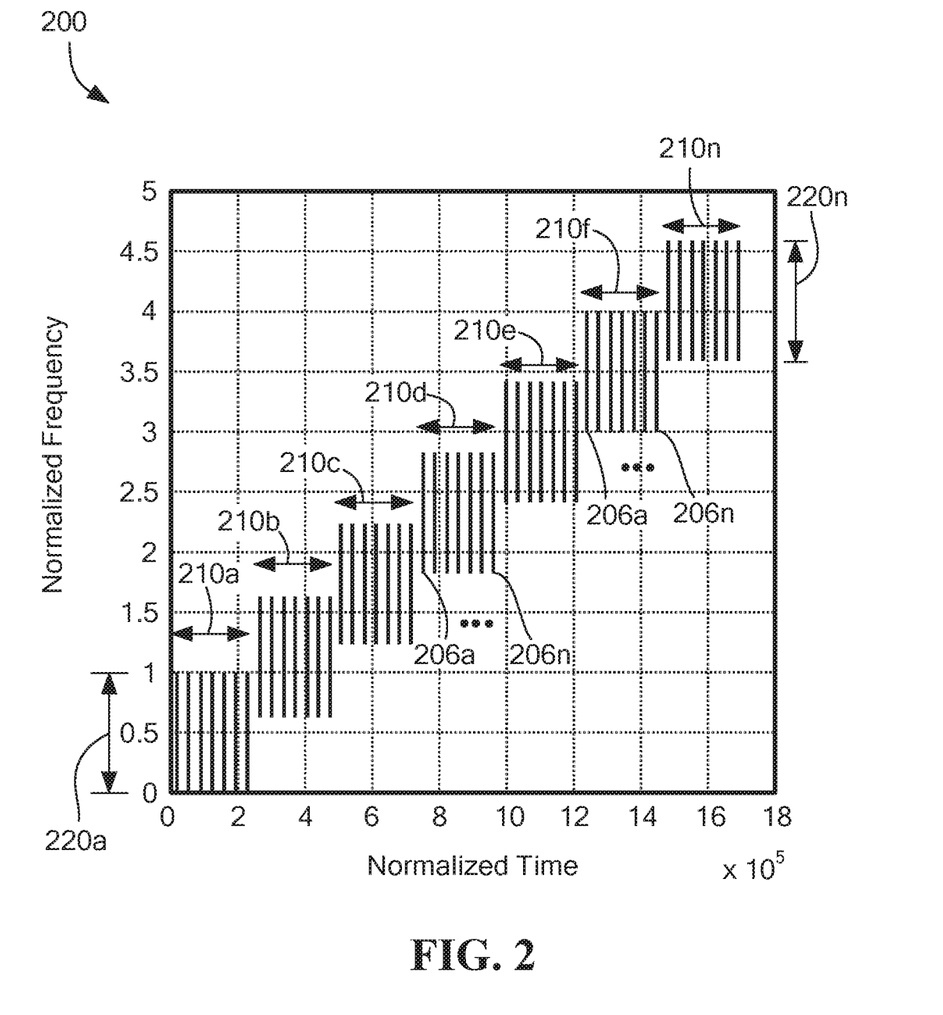
FIG. 2 is a plot of time (normalized) vs. frequency (normalized) of a FJB-PD waveform.

Now referring to FIG. 2, a plot of a FJB-PD waveform 200 is provided. In the plot, the x-axis represents a normalized time value and the y-axis represents a normalized frequency value.

The FJB-PD waveform 200 includes a plurality of pulses 206a-206n that are stepped in frequency at a plurality of frequency steps 220a-220n over a dwell time period. In an embodiment, the pulses 206a-206n may be grouped into sequences 210a-210n at each of the frequency steps 220a-220n, thus they may be referred to herein as a sequence of pulses.

In an embodiment, each sequence of pulses 210a-210n in the FJB-PD waveform 200 may include the same number of pulses. The number of pulses 206a-206n in each sequence 210a-210n may be based upon a number of parameters, including but not limited to, a pulse repetition interval (PRI) value, a desired amount of clutter suppression (or isolation), an amount of processing desired and/or a total dwell time period. For example, in one embodiment, a greater level of clutter suppression may be requested, however such a waveform may require a greater amount of processing time to analyze the returns correspond to this waveform. Thus, there may be a trade-off between the different parameters to select an appropriate number of pulses 206a-206n in each sequence 210a-210n for the FJB-PD waveform 200.

In an embodiment, the pulse repetition interval (PRI) value corresponds to the number of pulses in a specific time period (e.g., each frequency step duration). In the FJB-PD waveform 200, the PRI may be selected such that the PRI at each frequency step 220a-220n is inversely proportional to the step center frequency of the respective frequency step. In an embodiment, this may be done to maintain a constant range rate target at the same Doppler bin across the plurality of frequency steps 220a-220n, in order to preserve the clutter free region. The PRI may be a fixed PRI or a constant-Doppler PRI.

In some embodiments, the FJB-PD waveform 200 may have a fixed PRI at each of the frequency steps 220a-220n, represented by equation 1:

$$PRI_K = PRI_O \qquad \text{Equation 1}$$

Where $PRI_O$ is the PRI at a first frequency step in a waveform and $PRI_k$ is the PRI at the kth frequency step in a waveform.

In other embodiments, the FJB-PD waveform 200 may have a constant-Doppler PRI at each of the frequency steps 220a-220n, represented by equation 2:

$$PRI_k = \frac{F_O}{F_k} \times PRI_O \qquad \text{Equation 2}$$

Where $PRI_O$ is the PRI at a first frequency step in a waveform, $PRI_k$ is the PRI at the kth frequency step in a waveform, $F_O$ is a center frequency of first frequency step in a waveform and $F_k$ is a center frequency of kth frequency step in a waveform.

However, it should also be appreciated, that in other embodiments, one or more sequences of pulses 210a-210n in the FJB-PD waveform 200 may have a different number of pulses from another sequence.

In an embodiment, each sequence of pulses 210a-210n can be stepped in frequency over the dwell period at regular intervals. For example, and as illustrated in FIG. 2, each of the frequency steps 220a-220n may have the same duration (e.g., same time period or length). The duration of a frequency step 220a-220n may be based on a number of factors, including but not limited to, a Doppler resolution and a dwell time period at a particular step or for a waveform. In other embodiments, one or more frequency steps 220a-220n within the same FJB-PD waveform 200 may have a different duration.

In some embodiments, a ramp frequency of the FJB-PD waveform 200 may be based on a number of factors, including but not limited to a total bandwidth of the FJB-PD waveform 200, dwell time period for the FJB-PD waveform 200, a signal-to-noise ratio (SNR), Doppler resolution and desired wideband capabilities. For example, the FJB-PD waveform 200 may not have a defined slope, instead, the ramp frequency may be selected such that the waveform achieves full bandwidth in a predetermined time period (e.g., shortest time possible) while still meeting specified requirements such as SNR and Doppler resolution.

In some embodiments, an overlap may be established from the end of a frequency range of one frequency step 220a-220n to the beginning of another frequency step 220a-220n. For example, and as illustrated in FIG. 2, a first frequency step 220a may have a highest frequency of about 1, however the second, subsequent frequency step 220b may have a lowest frequency of about 0.6. Thus, an overlap in frequency can be established between pulses of adjacent frequency steps (e.g., the final or highest frequency of a first frequency step 220 and the initial starting frequency of a subsequent frequency step 220). The amount of overlap can be selected based on the factors listed above. For example, in one embodiment, to minimize a time period to reach full bandwidth, the amount of overlap may between each of the frequency steps 220a-220n may be minimized.

In some embodiments, the ramp frequency may be selected based on the capabilities (e.g., limitations) of the particular radar system being used. For example, in an embodiment having an older radar system may be band limited and/or have different beam focusing properties from a newer radar system, thus the ramp frequency of the FJB-PD waveform 200 may account for these limitations.

It should be appreciated however that the number of pulses, number of frequency steps and dwell may vary based on a particular application of the radar system transmitting and/or receiving the FJB-PD waveform 200.

Figure 3:
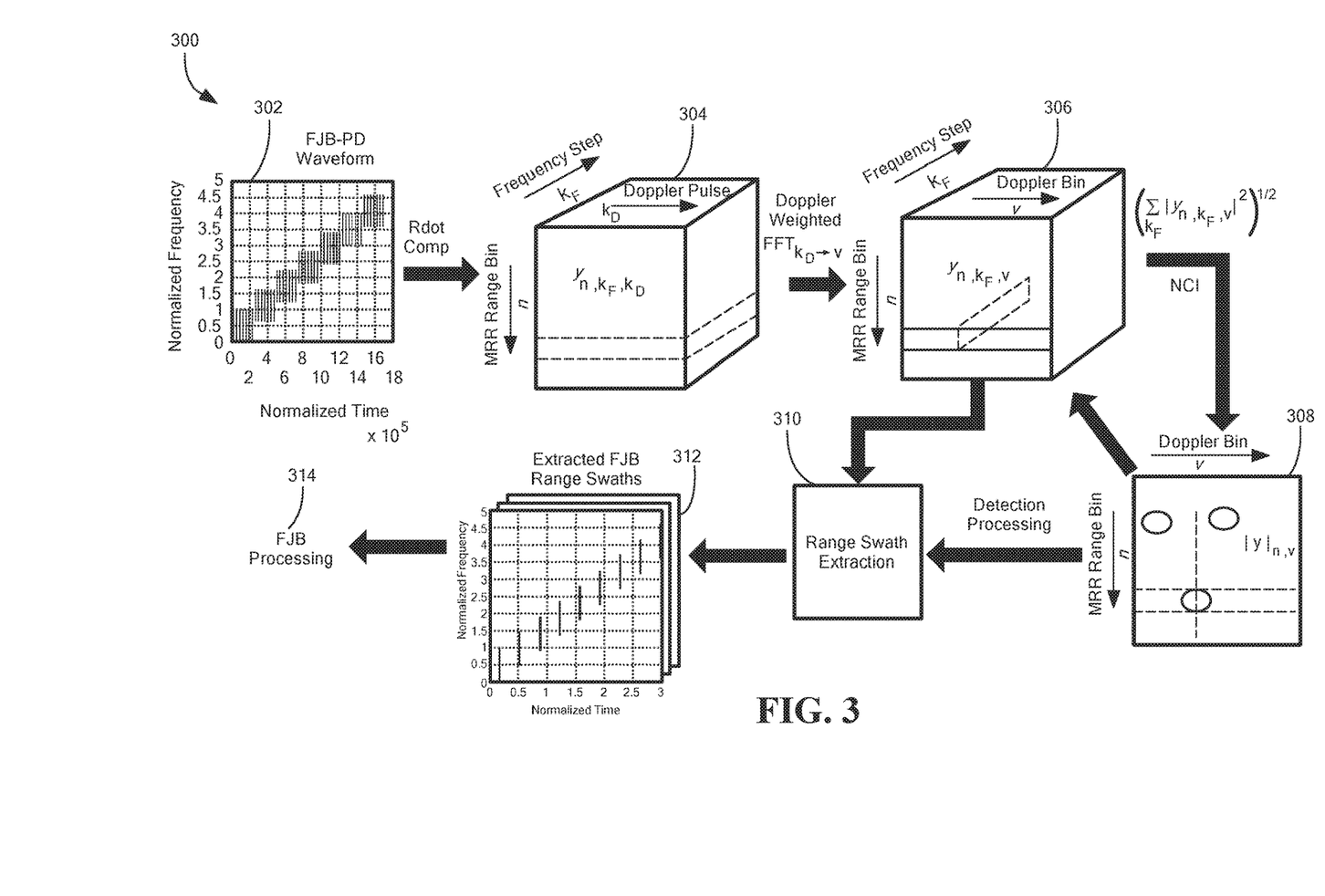
FIG. 3 is a pictorial representation of a method for performing FJB-PD target detection and extraction processing.

Now referring to FIG. 3, a pictorial representation of a FJB-PD detection and extraction processing method 300 is provided. The processing method 300 may include the processing and methods performed by the FJB-PD module 108 and FJB-PD extraction modules 104, 126 discussed above with respect to FIG. 1.

In an embodiment, the FJB-PD detection and extraction processing method 300 may receive one or more FJB-PD pulse returns, having a plurality of sequences of pulses (i.e., more than one pulse) at a plurality of different frequency steps, with each sequence of pulses at a different frequency step, and extract a single pulse from each sequence of pulses.

At block 302, FJB-PD pulse returns may be received. The FJB-PD pulse returns may correspond to a FJB-PD waveform transmitted at a target, for example, the FJB-PD waveform 200 described above with respect to FIG. 2. The FJB-PD pulse returns may be received and processed using the FJB-PD processing method 300.

At block 304, the FJB-PD pulse returns may be range-rate compensated and organized into a set of range-Doppler arrays. The range-rate compensation may be performed as a part of matched filter processing to detect the pulse returns in a return signal that may otherwise include clutter and noise. For example, each of the FJB-PD pulse returns may be passed through the matched filters. In some embodiments, the matched filter may be matched or generated using a coarse range-rate estimate from a narrowband tracker. The range-rate compensation may account for range walk, Doppler and quadratic phase compensation in FJB-PD pulse returns. In some embodiment, the range-rate compensation minimizes range and Doppler dispersion for selecting range-Doppler gates corresponding to the FJB-PD pulse returns.

The pulses in the FJB-PD pulse returns may be processed into a set of range-Doppler arrays. In an embodiment, the set of range-Doppler arrays can be used to facilitate separation of targets (i.e., target detections) from clutter and also help to resolve multiple targets that may be too close in range or range-rate to resolve in either dimension alone, similar to conventional PD processing.

In an embodiment, the set of range-Doppler array may be a radar data cube. For example, a range-Doppler array may be a three-dimensional array. In the illustrative embodiment of FIG. 3, a range bin value (n) may represent a first axis (direction), a frequency step value ($k_F$) may represent a second axis (direction) and a Doppler pulse value ($k_D$) may represent a third axis (direction) of the radar data cube. Thus, a range bin value (n) corresponds to particular range bin the range-Doppler array. The frequency step value ($k_F$) corresponds to a frequency step and indexes the frequency steps in a FJB-PD pulse return. The Doppler pulse value ($k_D$) corresponds to a Doppler direction and can index all of the pulses in a particular frequency step.

In an embodiment, each of the pulses in the FJB-PD pulse returns can be sorted into a range-Doppler array. In some embodiments, the pulses are organized according to each of the pulses' respective frequency step. For example, each pulse from the same frequency step (each pulse in a particular pulse sequence) may be sorted into the same range-Doppler array. Thus, at least one range-Doppler array may be generated for each frequency step in the FJB-PD pulse returns. In an embodiment, the set of range-Doppler arrays may initially be in a pulse domain or time domain.

At block 306, the set of range-Doppler arrays may be converted from the pulse domain or slow time domain to a Doppler domain or velocity domain using a Fast Fourier Transform (FFT). In the illustrative embodiment of FIG. 3, the range-Doppler array in the Doppler domain may have a range bin value (n) representing a first axis (direction), a frequency step value ($k_F$) may representing a second axis (direction) and a Doppler bin value (v) representing a third axis (direction). Thus, a range bin value (n) corresponds to particular range bin in the range-Doppler array. The frequency step value ($k_F$) corresponds to a frequency step and indexes the frequency steps in a FJB-PD pulse return. The Doppler pulse value (v) corresponds to a velocity value.

At block 308, the set of range-Doppler arrays in the Doppler domain may be non-coherently integrated (NCI) to determine and identify where the target detections are in each of the range-Doppler arrays. In some embodiments, the non-coherent integration may be performed prior to a constant false alarm rate (CFAR) processing being performed on the set of range-Doppler arrays to enhance target detection. The non-coherent integration may be performed over the range of frequency steps in a particular FJB-PD pulse return. For example, the non-coherent integration may be represented by equation 3:

$$\left( \sum_{k_F} |y_{n,k_F,v}|^2 \right)^{\frac{1}{2}} \qquad \text{Equation 3}$$

Where $k_F$ represents a frequency step value, $y_n$ represents a range bin value, v represents a velocity value. In an embodiment, the pulse data in each of the range-Doppler arrays may be integrated to identify the target detections. For example, and as illustrated in block 308 of FIG. 3, each of the dots may represent a target detection in a particular range bin (n) at a particular velocity (v).

In an embodiment, a list of target detections may be generated based on the non-coherent integration. The target detections from the non-coherent integration may be transmitted back the set of range-Doppler arrays in the Doppler domain at block 306. In the set of range-Doppler arrays, the target detections can be identified for each frequency step. For example, and as illustrated in FIG. 3 at block 306, the dotted rectangle indicates a target detection for one frequency step. In some embodiment, the dotted rectangle region may be referred to as a range swath.

At block 310, one or more range swaths may be extracted from the set of range-Doppler arrays. For example, for each target detection, a range swath may be extracted from the set of range-Doppler arrays. In some embodiments, a set of FJB range swaths may be generated for each target detection.

At block 312, a set of FJB range swaths for a target detection can be generated. In some embodiments, the extracted set of range-swaths for a particular target detection may be substantially similar to a FJB waveform, having a single pulse at a plurality of frequency steps. With the set of range-swaths for each target detection organized as a FJB waveform, FJB processing may be performed on the set of range swaths to generate a high range resolution profile. Thus, for each target detection, a set of FJB-PD returns can be processed substantially similar to a typical FJB waveform return. For example, the set of FJB range swaths may be provided to a FJB module, such as FJB modules 110, 130 described above with respect to FIG. 1.

Figure 4:
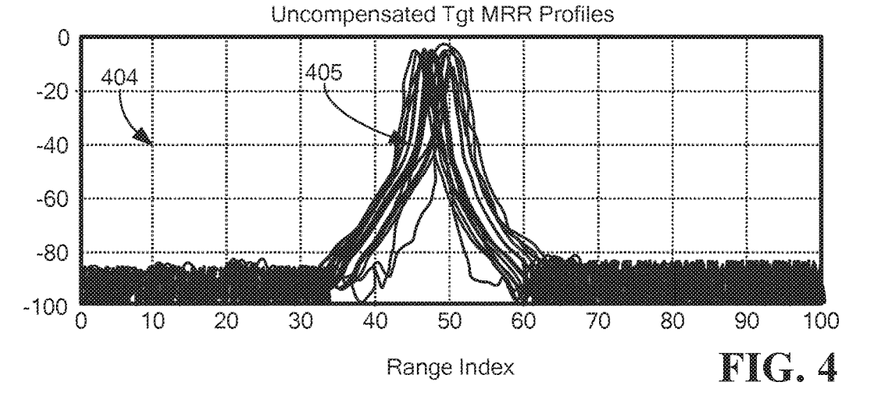
FIGS. 4-4B are plots of target return vs. range index comparing range-rate uncompensated and compensated target profiles.
Figure 4A:
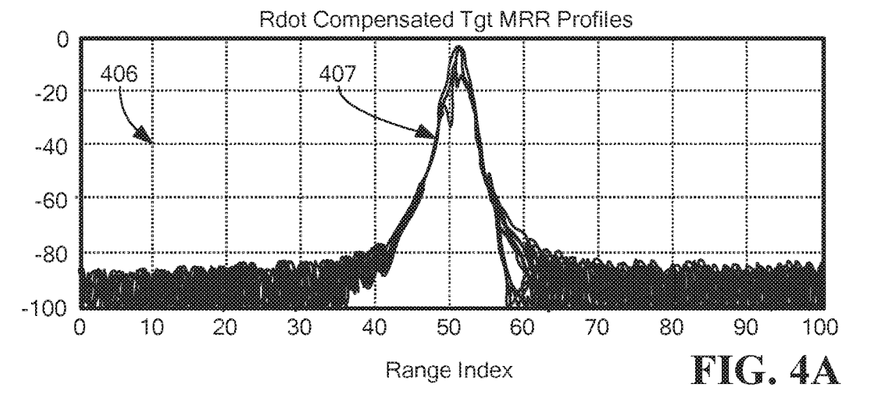
Figure 4B:
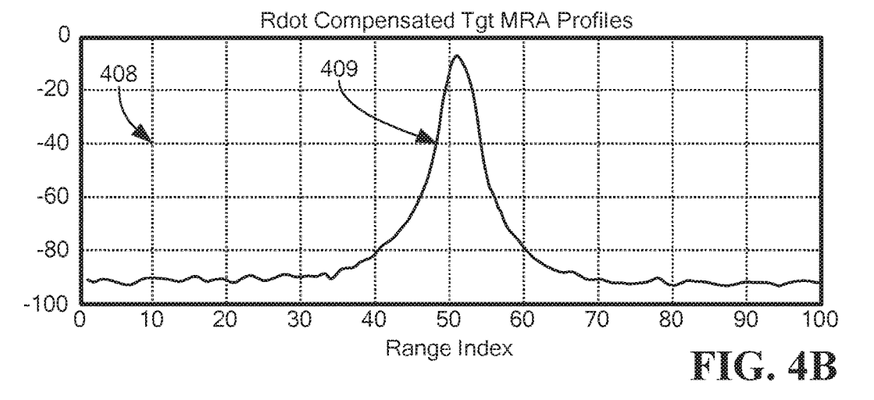
Figure 4C:
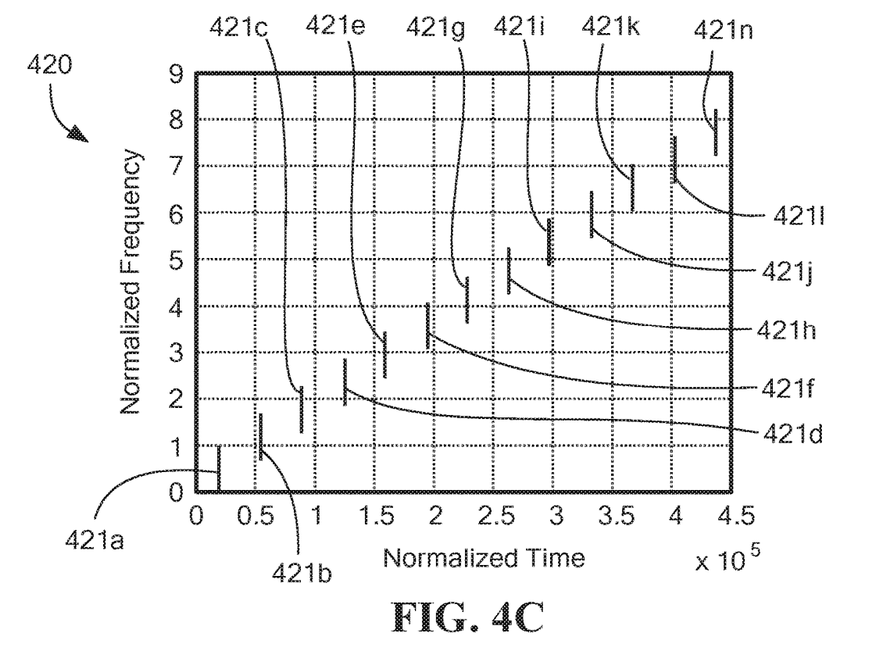
FIGS. 4C-4D are plots of time (normalized) vs. frequency (normalized) of pulse returns.
Figure 4D:
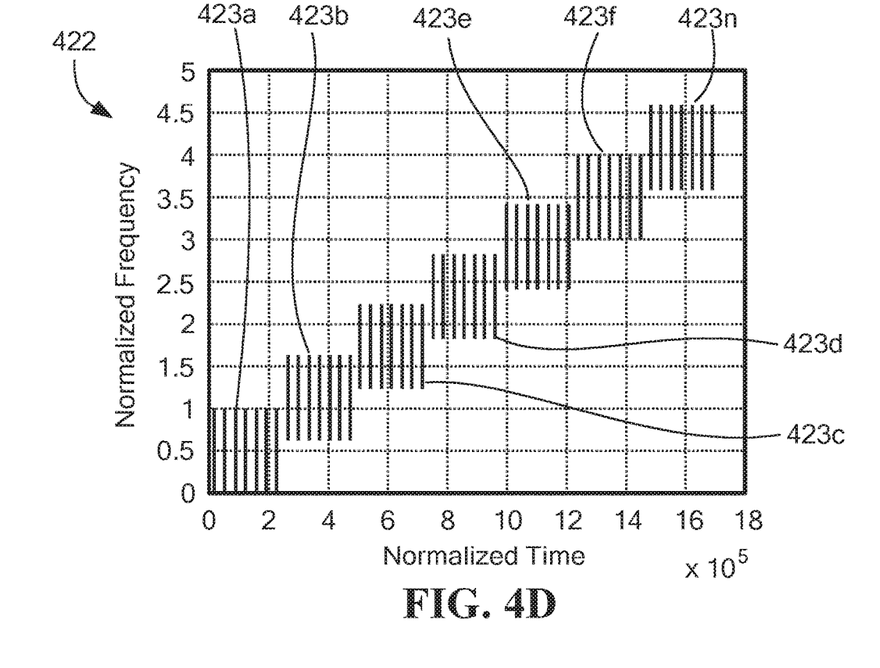

Now referring to FIGS. 4-4B, provide plots of target return vs. range index uncompensated and compensated target profiles and FIGS. 4C-4D provide plots of pulse returns. For example, FIG. 4 illustrates an uncompensated target profile 404. The target profile may correspond to either a FJB pulse return 420 having a plurality of sequences of pules 421a-421n (as illustrated in FIG. 4C) or a FJB-PD pulse return 422 having a plurality of sequences of pulses 423a-423n (as illustrated in FIG. 4D). As illustrated in FIG. 4, the range-rate uncompensated target profiles in 404 include target detections at separate frequency steps and offset in range due to target range walk. The noise and frequency dependent target fluctuation in the profile makes it more difficult to identify the target detection 405 and identify properties of the target detection 405. To reduce the noise and frequency dependent target fluctuation in the profile, the uncompensated target profile 404 may be range-rate compensated when it is received and noncoherently integrated.

In an embodiment, each of the pulse returns 421a-421n, 423a-423n may be passed through matched filters. In some embodiments, the matched filter may be matched or generated using a coarse range-rate estimate from a narrowband tracker. The range-rate compensation may account for range walk, Doppler and quadratic phase compensation in the pulse returns. In some embodiment, the range-rate compensation minimizes range and Doppler dispersion for selecting range-Doppler gates corresponding to the pulse returns 421a-421n, 423a-423n. In some embodiments, the individual profiles 404 of FIG. 4 and 406 of FIG. 4A may be referred to as MRR profiles.

FIG. 4A and FIG. 4B provide illustrative examples of post range-rate compensated target profiles 406, 408. In FIG. 4A, the compensated target profile 406 includes the range aligned target detections 407. The pulse returns 421a-421n, 423a-423n have been filtered to range align the target detection 407 in the compensated target profile 406.

In FIG. 4B, the compensated and noncoherently integrated target profile 408 includes a target detection 409, wherein almost all of the original noise has been visibly reduced and the frequency dependent fluctuations averaged out from the pulse returns 421a-421n, 423a-423n. Thus, the target detection 409 is easier to detect. In some embodiments, the compensated and noncoherently integrated target profile 408 in FIG. 4B may be referred to as an MRA profile.

Figure 5:
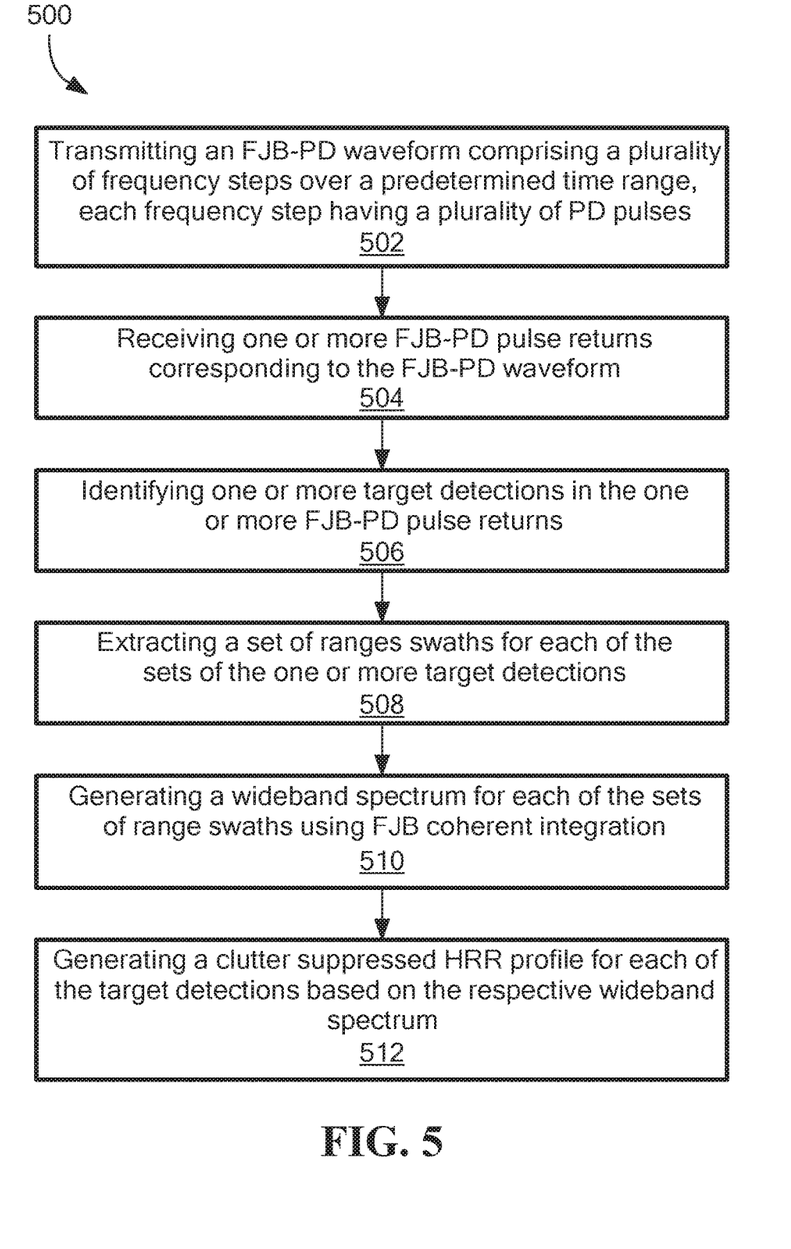
FIG. 5 is a flow diagram of a method for performing FJB-PD processing.

Now referring to FIG. 5, a method 500 for processing a frequency jump burst-pulse Doppler (FJB-PD) waveform includes, transmitting an FJB-PD waveform comprising a plurality of frequency steps over a predetermined time period, with each frequency step having a plurality of pulses, receiving one or more FJB-PD pulse returns corresponding to the FJB-PD waveform, identifying one or more target detections in the one or more FJB-PD pulse returns, extracting a set of range swaths for each of the one or more target detections, generating a wideband spectrum for each of the sets of range swaths using FJB coherent integration and generating a clutter suppressed high range resolution (HRR) profile for each of the target detections based on the respective wideband spectrum.

At block 502, a FJB-PD waveform may be transmitted from a radar system. In an embodiment, the FJB-PD waveform may be generated to include multiple pulse (Pulse Doppler pulses) sequences that are stepped in frequency over the dwell at regular intervals. In an embodiment, a sequence may include two or more pulses at a particular frequency step. For example, the FJB-PD waveform may include a plurality of frequency steps over a predetermined time period (e.g., dwell period), with each of the frequency steps having a plurality of pulses.

In some embodiments, each sequence of pulses may have a fixed pulse repetition internal (PRI) at each frequency step. In other embodiments, each sequence of pulses may have a constant-Doppler PRI at each frequency step. The PRI may be selected such that the PRI at each frequency step is inversely proportional to a step center frequency of the respective frequency step.

In some embodiments, the FJB-PD waveform may be transmitted internally within a radar system or externally to point calibration source, such as a corner reflector. This generates the calibration FJB-PD waveform and it may be used to capture the transfer function of the radar system. In some embodiments, the transfer function may have corruptive qualities that can corrupt the processing of received waveforms and the generation of HRR profiles. Thus, the calibration FJB-PD waveform can be used to detect these corruptive issues and to filter them out prior to generating an HRR profile.

At block 504, one or more FJB-PD pulse returns may be received corresponding to the transmitted FJB-PD waveform. The one or more FJB-PD pulse returns may include signals received from sources external to the radar system. In some embodiments, one or more calibration FJB-PD pulse returns may be received. In an embodiment, the one or more FJB-PD pulse returns and the one or more calibration FJB-PD pulse returns may be processed using different paths in the radar system, however they may be processed in substantially the same manner. Thus, with the processing described herein with respect to the one or more FJB-PD pulse returns is intended to also apply the one or more calibration FJB-PD pulse returns.

The one or more FJB-PD pulse returns may be processed using a combination of FJB-PD processing methods and FJB processing methods. For example, the one or more FJB-PD pulse returns may be first processed by FJB-PD extraction modules, such as FJB-PD extraction modules 104, 126 described above with respect to FIG. 1. The output of the FJB-PD extraction modules may then be provided to a FJB module, such as FJB module 106 described above with respect to FIG. 1.

A range-rate compensation may be performed on the one or more FJB-PD pulse returns when they are received and a set of range-Doppler arrays may be generated. In an embodiment, at least one range-Doppler array may be generated for each frequency step in the FJB-PD pulse returns. For example, a matched filtering process may be performed using a coarse range-rate estimate from a narrowband tracker. The FJB-PD pulse returns may then be organized into the set of range-Doppler arrays. In an embodiment, each range-Doppler array may be a radar data cube, organizing the FJB-PD pulse return data according to a range bin value, a frequency step value ($k_F$) and a Doppler pulse value ($k_D$).

Each of the pulses in the FJB-PD pulse returns can be sorted into a particular range-Doppler array. In some embodiments, the pulses are organized according to their respective frequency step. For example, each pulse from the same frequency step (each pulse in a particular pulse sequence) may be sorted into the same range-Doppler array.

The set of range-Doppler arrays may initially be in a pulse domain or time domain. To convert the set of range-Doppler arrays from the pulse domain to the Doppler domain, a Fast Fourier Transform (FFT) may be performed on the set of range-Doppler arrays. In the Doppler domain, the FJB-PD pulse return data in the set of range-Doppler arrays may be organized according to a range bin value (n), a frequency step value (kF) and a Doppler bin value (v).

At block 506, one or more target detections may be identified in the one or more FJB-PD pulse returns. In some embodiments, to aid in identifying the target detections in the set of range-Doppler arrays a non-coherent integration (NCI) may be performed. The non-coherent integration may be performed over the range of frequency steps corresponding to each range-Doppler array. For example, the pulse data in each of the range-Doppler arrays may be integrated to identify the target detections. In some embodiments, a list of target detections may be generated based on the non-coherent integration. The target detections can then be identified for each frequency step in each range-Doppler array.

At block 508, a set of range swaths may be extracted for each of the one or more target detections in the set of range-Doppler arrays. In some embodiments, for each target detection a range swath or a set or range swaths may be extracted. The range swath may refer to the target detections across frequency steps.

In some embodiment, a FJB waveform corresponding to a set of FJB range swaths for a target detection can be generated. The extracted set of range-swaths for a particular target detection may be substantially similar to a FJB waveform. For example, the extracted set of range-swaths may have a single pulse at a plurality of frequency steps. With the set of range-swaths for each target detection organized as a FJB waveform, FJB processing may be performed on the set of range swaths to generate a high range resolution profile. Thus, for each target detection, a set of FJB-PD returns can be processed substantially similar to a typical FJB waveform return. For example, the set of FJB range swaths may be provided to a FJB module, such as FJB modules 110, 130 described above with respect to FIG. 1.

At block 510, a wideband spectrum may be generated for each of the sets of range swaths using FJB coherent integration. Each set of range swaths may correspond to a single, unique target detection, thus each target detection can be independently FJB-processed to generate a unique high range resolution (HRR) profile for that target detection.

In an embodiment, FJB processing may be performed on each set of FJB range swaths. Each set of range-swaths may be range-rate compensated and a spectra corresponding the set of range swaths may be generated. In an embodiment, the spectra may correspond to a mid-band (MB) target profile that is generated for each set of range swaths.

A FJB coherent integration may be performed on each spectra. For example, a fast Fourier transform (FFT) can be performed on each spectra to generate a mid-band target subspectra for each set of range swaths. The subspectra may be coherently summed to generate a wideband target spectrum. In an embodiment, at least one wideband spectrum can be generated for each of the one or more target detections.

In some embodiments, the transceiver chain (e.g., transmit and receive path 140 of FIG. 1) may have spectral nonlinearities (e.g., corruptive transfer function qualities) and there may be rippling from overlapping spectra. To account for these potential corruptive issues, and as stated above, a calibration wideband target spectrum may be generated corresponding to a received calibration FJB-PD waveform using the same processing described herein to generate the wideband target spectrum. In an embodiment, as the calibration FJB-PD waveform is originally transmitted internally, it can capture transfer function qualities of the radar and be used to detect any corruptive issues that may impact a final range profile.

The calibration wideband spectrum may be compared with the wideband target spectrum to identify the rippling effects from overlapping spectra and the transceiver chain spectral nonlinearities that may have corrupted the wideband target spectrum. In some embodiment, are compared using the following equation:

$$\frac{Y(f_M)}{H(f_M)} W(f_M)$$

Where $Y(f_M)$ represents the wideband spectrum, $H(f_M)$ represents the calibration wideband spectrum and W(fM) represents a spectral weighting for range sidelobe suppression. Using the equation above, a combined wideband target spectrum may be generated that is a combination of the wideband target spectrum and the calibration target spectrum and the applied weighted signal.

At block 512, a clutter suppressed high range resolution (HRR) profile may be generated for each of the target detections based on the respective wideband spectrum. In an embodiment, an inverse fast Fourier transform (IFFT) may be performed on the combined wideband target spectrum to convert the combined wideband target spectrum from the frequency domain to the range domain (time domain) and generate a high range resolution (HRR) profile of the respective target detection. A HRR profile may be generated for each target detection in a clutter dense environment.

Figure 6:
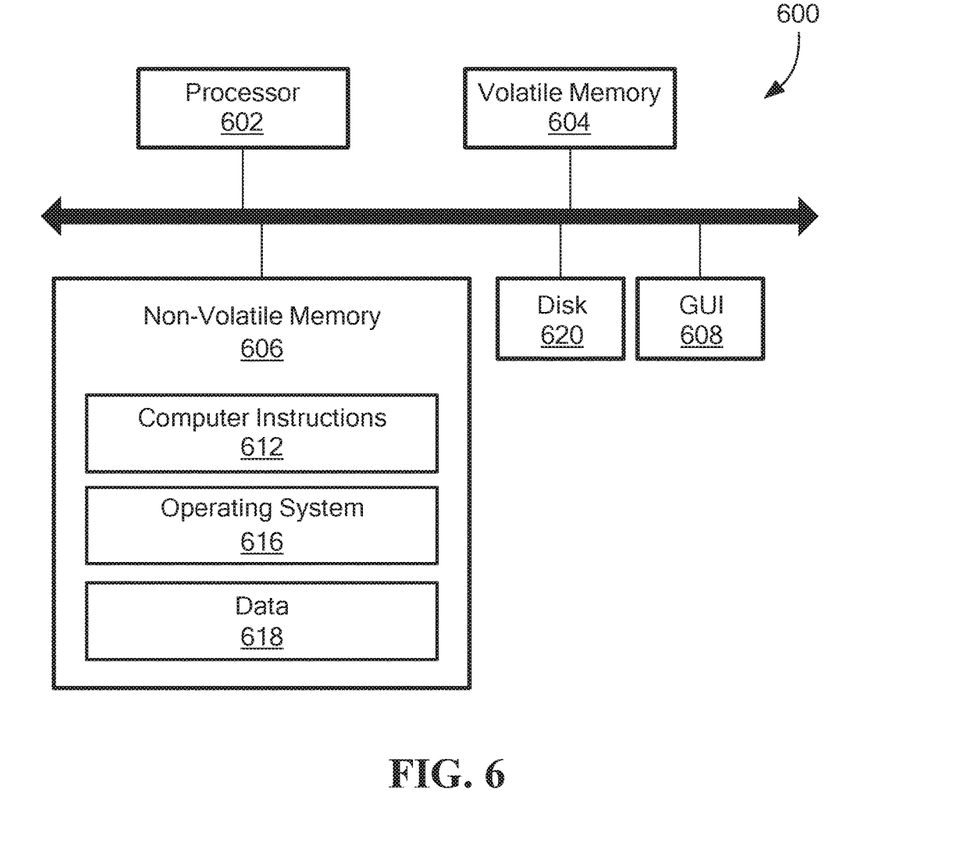
FIG. 6 is a block diagram of a processing system of the type which may be used to implement the FJB-PD processing described in conjunction with FIGS. 1-5.

Referring to now FIG. 6, a computer 600 includes a processor 602, a volatile memory 604, a non-volatile memory 606 (e.g., hard disk), a graphical user interface (GUI) 608 (e.g., a mouse, a keyboard, a display, for example) and a computer disk 620. The non-volatile memory 606 stores computer instructions 612, an operating system 616 and data 618. In an embodiment, the data 618 may correspond to FJB-PD waveforms and pulse returns, as well as FJB waveforms and pulse returns. In some embodiments, non-volatile memory 606 includes a look-up table that stores and organizes data corresponding to the FJB-PD waveforms and pulse returns, as well as FJB waveforms and pulse returns. In one example, the computer instructions 612 are executed by the processor 602 out of volatile memory 604 to perform all or part of the method (or process) 300 of FIG. 3 or method (or process) 500 of FIG. 5.

In an embodiment, computer 600 may be the same as or substantially similar to each of waveform processing system 100, FJB-PD processing module 108, FJB processing module 106, FJB-PD extraction module 104, 126, FJB coherent integration modules 110, 130 and a wideband calibration module 112 of FIG. 1. Computer 600 may perform all of the same functions and be configured to receive and generate the same data as each of waveform processing system 100, FJB-PD processing module 108, FJB processing module 106, FJB-PD extraction module 104, 126, FJB coherent integration modules 110, 130 and a wideband calibration module 112 of FIG. 1, as described herein. For example, computer 600 may be configured to receive FJB-PD pulse returns, perform FJB-PD processing, FJB processing and generate high range resolution profiles for one or more target detections.

Methods 300 and 500 are not limited to use with the hardware and software of FIG. 6; they may find applicability in any computing or processing environment and with any type of machine or set of machines that is capable of running a computer program. Methods 300 and 500 may be implemented in hardware, software, or a combination of the two. Methods 300 and 500 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform method 200 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform methods 300 and 500. Methods 300 and 500 may also be implemented as a machine-readable storage medium, configured with a computer program, where upon execution, instructions in the computer program cause the computer to operate in accordance with methods 300 and 500.

Methods 300 and 500 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A number of embodiments of the disclosure have been described. Nevertheless, it will be understood that various modifications may be made without departing from the spirit and scope of the disclosure. Elements of different embodiments described herein may be combined to form other embodiments not specifically set forth above. Other embodiments not specifically described herein are also within the scope of the following claims.

What is claimed:

1. A method comprising:
   transmitting a frequency jump burst-pulse Doppler (FJB-PD) waveform comprising a plurality of frequency steps over a predetermined time period, each frequency step having a plurality of pulses;
   receiving one or more FJB-PD pulse returns corresponding to the FJB-PD waveform;
   identifying one or more target detections in the one or more FJB-PD pulse returns;
   extracting a set of range swaths for each of the identified one or more target detections;
   generating a wideband spectrum for each of the sets of range swaths using FJB coherent integration, wherein at least one wideband spectrum is generated for each of the one or more target detections; and
   generating a clutter suppressed high range resolution (HRR) profile for each of the target detections based on the respective wideband spectrum.

2. The method of claim 1, further comprising performing range-rate compensation on the one or more FJB-PD pulse returns.

3. The method of claim 1, further comprising generating a set of range-Doppler arrays for the one or more FJB-PD pulse returns, wherein at least one range-Doppler array is generated for each frequency step.

4. The method of claim 3, further comprising integrating the set of range-Doppler arrays over the plurality of frequency steps using non-coherent integration.

5. The method of claim 3, further comprising performing constant false alarm rate (CFAR) processing on the set of range-Doppler arrays.

6. The method of claim 1, further comprising performing wideband calibration on the wideband spectrum.

7. The method of claim 1, further comprising generating the FJB-PD waveform comprising the plurality of frequency steps over the predetermined time period.

8. The method of claim 1, further comprising generating a sequence of the plurality of pulses for each of the frequency steps, wherein each of the sequences has at least one of a constant-Doppler pulse repetition interval (PRI) or a fixed pulse repetition interval (PRI).

9. The method of claim 8, wherein the PRI at each of the plurality of frequency steps is inversely proportional to a step center frequency of the respective frequency step.

10. The method of claim 1, further comprising transmitting a calibration FJB-PD waveform comprising a plurality of frequency steps over a predetermined time period, each frequency step having a plurality of pulses, wherein the calibration FJB-PD waveform is transmitted internally or externally to a radar system.

11. The method of claim 10, further comprising:
    receiving calibration FJB-PD pulse returns corresponding to the calibration FJB-PD waveform; and
    generating a calibration wideband spectrum based on the calibration FJB-PD pulse returns.

12. The method of claim 11, further comprising:
    comparing the calibration wideband spectrum to the wideband spectrum to detect a transfer function of the radar system; and
    generating the clutter suppressed HRR profile for each of the target detections responsive to the comparison.

13. A method comprising:
    transmitting a frequency jump burst-pulse Doppler (FJB-PD) waveform comprising a plurality of frequency steps over a predetermined time period, each frequency step having a plurality of pulses;
    receiving one or more FJB-PD pulse returns corresponding to the FJB-PD waveform;

generating a set of range-Doppler arrays for the one or more FJB-PD pulse returns, wherein at least one range-Doppler array is generated for each frequency step;

identifying one or more target detections in the one or more FJB-PD pulse returns using the set of range-Doppler arrays; and extracting a set of range swaths corresponding to each of the identified one or more target detections from the set of range-Doppler arrays.

14. The method of claim 13, further comprising generating the FJB-PD waveform comprising the plurality of frequency steps over the predetermined time period.

15. The method of claim 13, further comprising generating a sequence of the plurality of pulses for each of the frequency steps, wherein each of the sequences has at least one of a constant-Doppler pulse repetition interval (PRI) or a fixed pulse repetition interval (PRI).

16. The method of claim 15, wherein the PRI at each of the plurality of frequency steps is inversely proportional to a step center frequency of the respective frequency step.

17. The method of claim 13, further comprising performing range-rate compensation on the one or more FJB-PD pulse returns.

18. The method of claim 13, further comprising isolating one or more targets from clutter in the one or more FJB-PD pulse returns.

19. The method of claim 13, further comprising integrating the set of range-Doppler arrays over the plurality of frequency steps using non-coherent integration.

20. The method of claim 13, further comprising performing constant false alarm rate (CFAR) processing on the set of range-Doppler arrays.

21. The method of claim 13, further comprising coherently integrating the set of range swaths using FJB coherent processing.

22. The method of claim 21, further comprising processing each of the one or more target detections using FJB processing independent of another of the one or more target detections.

23. The method of claim 21, further comprising generating clutter suppressed high range resolution (HRR) profiles for each of the target detections.

* * * * *